(12) United States Patent
Mauterer

(10) Patent No.: US 11,345,240 B2
(45) Date of Patent: May 31, 2022

(54) ELECTRICAL ON-BOARD NETWORK DEVICE FOR SUPPLY OF AT LEAST TWO ELECTRICAL LOADS IN A MOTOR VEHICLE, AND MOTOR VEHICLE, SWITCHING DEVICE, AND METHOD FOR OPERATING AN ON-BOARD NETWORK DEVICE

(71) Applicant: Volkswagen Aktiengesellschaft, Wolfsburg (DE)

(72) Inventor: Thomas Mauterer, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/057,603

(22) PCT Filed: May 7, 2019

(86) PCT No.: PCT/EP2019/061619
§ 371 (c)(1),
(2) Date: Nov. 20, 2020

(87) PCT Pub. No.: WO2019/223995
PCT Pub. Date: Nov. 28, 2019

(65) Prior Publication Data
US 2021/0094421 A1    Apr. 1, 2021

(30) Foreign Application Priority Data

May 22, 2018  (DE) .................... 10 2018 207 960.9

(51) Int. Cl.
*B60L 3/00* (2019.01)
*B60R 16/03* (2006.01)
*H02J 1/08* (2006.01)

(52) U.S. Cl.
CPC ............ *B60L 3/0023* (2013.01); *B60R 16/03* (2013.01); *H02J 1/082* (2020.01)

(58) Field of Classification Search
CPC .. B60L 3/0023; B60L 3/04; B60L 1/00; B60L 15/12; B60L 50/11; B60L 50/50;
(Continued)

(56) References Cited

U.S. PATENT DOCUMENTS 9,656,620 B2    5/2017  Proebstle
9,966,675 B2    5/2018  Wortberg et al.
(Continued)

FOREIGN PATENT DOCUMENTS

| CN | 103595256 A | 2/2014 | ............ H02M 3/335 |
| CN | 107379969 A | 11/2017 | ................ B60L 3/00 |

(Continued)

OTHER PUBLICATIONS

German Office Action, Application No. 102018207960.9, 7 pages, dated Feb. 11, 2019.

(Continued)

*Primary Examiner* — Lincoln D Donovan
*Assistant Examiner* — Alex W Lam
(74) *Attorney, Agent, or Firm* — Slayden Grubert Beard PLLC

(57) ABSTRACT

The invention relates to an on-board network device for supplying at least two electrical loads with an on-board network voltage in a motor vehicle, wherein the on-board network device has a connection device for receiving the on-board network voltage from a voltage source and a first on-board network branch for connecting one or some of the loads and for forwarding the on-board network voltage to each connected load. A second on-board network branch is provided for connecting each remaining load and for forwarding the on-board network voltage to each remaining (Continued)

load and that the connecting device is connected to both the first on-board network branch and the second on-board network branch via at least one switching element and that a control device is configured to electrically connect the connection device in an alternating manner to the first and second on-board network branches by switching the at least one switching element.

20 Claims, 1 Drawing Sheet

(58) Field of Classification Search
CPC .......... B60L 50/60; B60L 53/20; B60L 53/53; B60L 58/10; B60L 58/15; B60L 58/18; B60L 58/19; B60L 58/21; B60L 58/20; B60L 58/40; B60L 50/51; B60L 8/003; B60L 58/22; B60L 2210/10; B60L 3/0046; B60L 1/003; H02J 1/082; H02J 7/34; H02J 1/10; H02J 1/108; H02J 2310/46; H02J 2310/48; H02J 2310/40; H02J 1/102; H02J 7/1423; H02J 7/342; H02J 7/0013; B60R 16/03; B60R 16/033; B60R 16/04; Y02T 10/70; Y02T 10/10; Y02T 90/167; G08C 19/02
See application file for complete search history.

(56) References Cited

U.S. PATENT DOCUMENTS

| | | | |
|---|---|---|---|
| 10,131,298 B2 | 11/2018 | Boucharel et al. | |
| 2011/0273012 A1 | 11/2011 | Tardy | 307/9.1 |
| 2018/0262044 A1* | 9/2018 | Schipperges | H02J 7/0063 |

FOREIGN PATENT DOCUMENTS

| | | | |
|---|---|---|---|
| DE | 10348162 B3 | 1/2005 | ............... H02J 1/10 |
| DE | 102005013440 A1 | 10/2006 | ............ B60R 16/03 |
| DE | 102010014070 A1 | 4/2011 | ............ G01R 31/00 |
| DE | 102012206772 A1 | 10/2013 | ............... B60L 11/18 |
| DE | 102012209144 A1 | 12/2013 | ............ B60R 16/03 |
| DE | 102014203030 A1 | 8/2015 | ............ B60R 16/03 |
| DE | 102016111690 A1 | 12/2016 | ............ B60R 16/03 |
| DE | 102016007988 A1 | 2/2017 | ............ B60R 16/03 |
| DE | 102015012944 A1 | 4/2017 | ............ B60R 16/03 |
| DE | 102018207960 A1 | 11/2019 | ............ B60R 16/03 |
| WO | 2013/061110 A1 | 5/2013 | ............ B60R 16/02 |
| WO | 2015/071045 A1 | 5/2015 | ............... H02J 1/10 |
| WO | 2017/151784 A1 | 9/2017 | ............. B60L 50/15 |
| WO | 2019/223995 A1 | 11/2019 | ............... H02J 1/10 |

OTHER PUBLICATIONS

International Search Report and Written Opinion, Application No. PCT/EP2019/061619, 21 pages, dated Jun. 14, 2019.

* cited by examiner

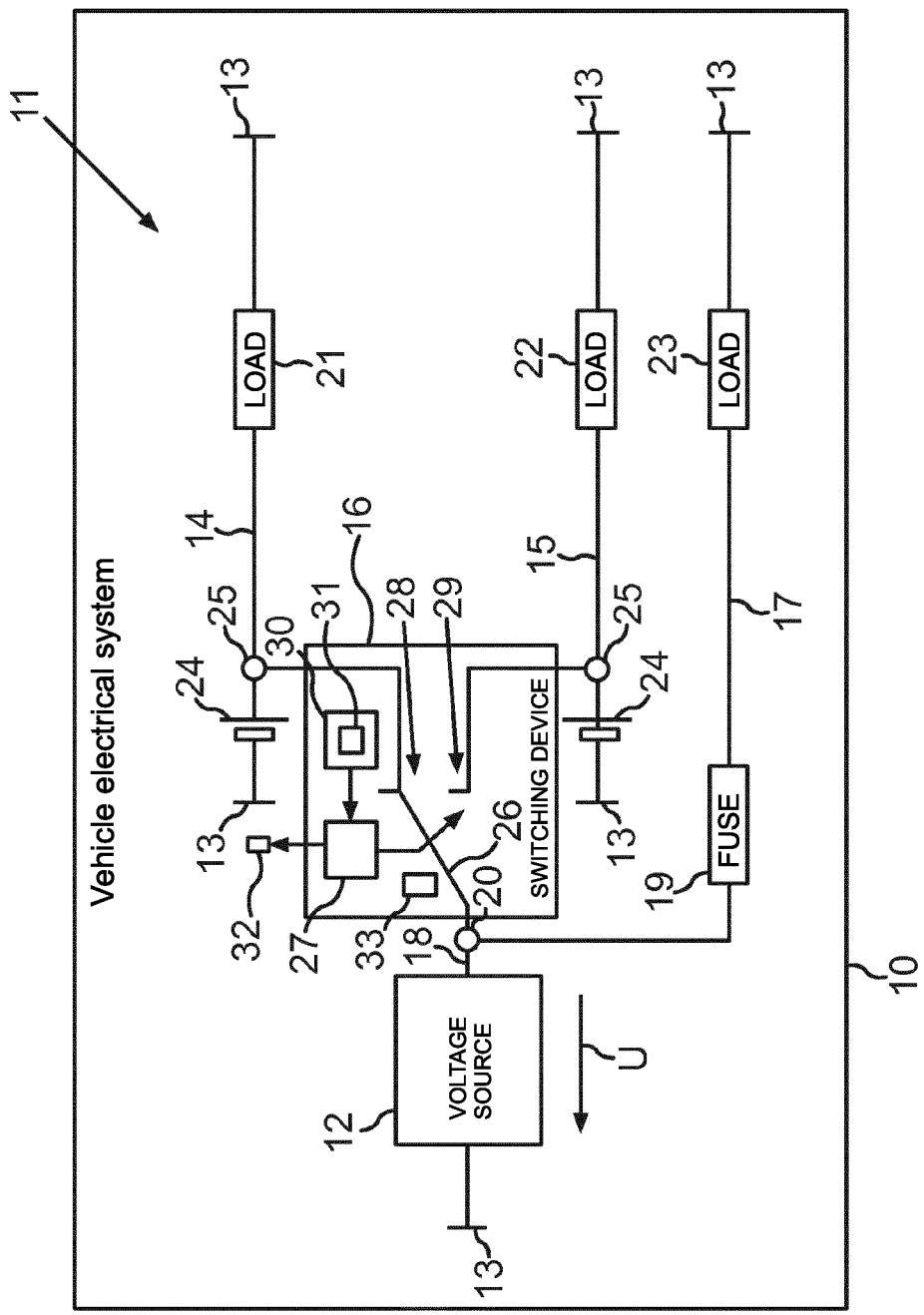

ELECTRICAL ON-BOARD NETWORK DEVICE FOR SUPPLY OF AT LEAST TWO ELECTRICAL LOADS IN A MOTOR VEHICLE, AND MOTOR VEHICLE, SWITCHING DEVICE, AND METHOD FOR OPERATING AN ON-BOARD NETWORK DEVICE

CROSS-REFERENCE TO RELATED APPLICATIONS

This application claims priority to German Patent Application No. DE 10 2018 207 960.9, filed on May 22, 2018 with the German Patent and Trademark Office. The contents of the aforesaid Patent Application are incorporated herein for all purposes.

TECHNICAL FIELD/BACKGROUND

This section is provided for the purpose of generally describing the context of the disclosure. Work of the presently named inventor(s), to the extent the work is described in this section, as well as aspects of the description that may not otherwise qualify as prior art at the time of filing, are neither expressly nor impliedly admitted as prior art against the present disclosure.

The invention relates to an on-board network device for supplying at least two electrical loads in a motor vehicle. The loads may be supplied with an electrical on-board network voltage from a voltage source via the on-board network device. The invention also includes a motor vehicle with the on-board network device and a switching device, which is an important part of the on-board network device. Finally, the invention also includes a method for operating the on-board network device.

By means of said on-board network device, a so-called on-board network may be provided in a motor vehicle, that is to say an electrical distribution device, in order to transmit an on-board network voltage from a voltage source to at least two electrical loads. For example, a 12-volt vehicle on-board network may be provided in a motor vehicle, in which the vehicle on-board network voltage has a nominal value of 12 volts. Other known types of on-board networks are a 48-volt on-board network and a high-voltage on-board network, in which case an on-board network voltage of greater than 60 volts, in particular greater than 100 volts, may be provided.

The voltage source and the electrical loads are electrically coupled to one another by the on-board electrical system. If, however, a fault occurs in one of the electrical loads, for example a short circuit, the voltage source and every other load are also affected. This is particularly undesirable in the case of electrical loads that are relevant to the driving ability of the motor vehicle. If such a load becomes inoperable due to a fault in the on-board network, the entire motor vehicle is incapable of driving. In this context, it is known to provide a redundant electrical supply for some electrical loads in a motor vehicle. However, this is associated with higher component costs, in particular when two voltage sources are to be provided.

SUMMARY

An object exists to limit the effect of a fault in an on-board network device in a motor vehicle in such a way that not all electrical loads are impaired in their functionality by the fault.

The object is achieved by the subject matter of the independent claims. Embodiments of the invention are discussed in the dependent claims and the following description.

BRIEF DESCRIPTION OF THE DRAWINGS

The only FIGURE shows a schematic representation of an embodiment of the motor vehicle, in which an embodiment of a method according to the teachings herein may be carried out.

DETAILED DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect provides an electrical on-board network device by means of which at least two electrical loads in a motor vehicle may be supplied with an on-board network voltage. The vehicle on-board network device has a connection device for receiving the vehicle on-board network voltage from a voltage source. The on-board network voltage may therefore be electrically connected to the voltage source by means of the connection device. The vehicle on-board network voltage for example is a direct voltage. For example, the vehicle on-board network voltage may have a nominal value of 12 volts.

An on-board network branch of the on-board network device is configured for connecting one or some of the said loads and for forwarding the on-board network voltage to each of the connected loads. For example, the on-board network branch may, e.g., be implemented on the basis of at least one cable and/or at least one power rail. Not all loads are connected to the on-board network branch, but only one load or some of the loads. The on-board network branch is referred to herein as the first on-board network branch.

In order to reduce the influence of an electrical fault in the on-board network device, a second on-board network branch is provided to which any remaining load may be connected. The second on-board network branch is configured to forward the on-board network voltage to each of the other loads, that is to say to every load that is connected to the second on-board network branch. The second on-board network branch may, e.g., also be implemented in the manner described on the basis of at least one cable and/or at least one power rail. In the on-board network device, there is therefore one connection device and two on-board network branches.

In the on-board network device, the connection device may be connected to the first on-board network branch and to the second on-board network branch via a switching element or several switching elements of a switching device. The switching device therefore may be connected between the connection device on the one hand and the two on-board network branches on the other hand. The switching device may be used to switch between the two on-board network branches by activating the at least one switching element or by changing its switching state. Thus, the connection device (and thus the voltage source) in a first switching position of the at least one switching element is electrically coupled to the first on-board network branch and to the second on-board network branch in a second switching position of the at least one switching element. In contrast, the other on-board network branch in each case is electrically decoupled from the connection device (and thus from the voltage source). In the on-board network device, a control device of the switching device is configured to electrically couple the connection device in an alternating manner to the first on-board network branch and to the second on-board network branch by switching over the at least one switching element. While one of the on-board network branches is electrically coupled to the connection device, the respective other on-board network branch is electrically decoupled from the connection device in the aforementioned manner. The vehicle on-board network voltage from the voltage source is therefore only transmitted to or forwarded to one of the two vehicle electrical system branches at any given time.

The present aspect has the benefit that in the event of an electrical load generating an electrical fault in the on-board network device, this fault only has an effect on that on-board network branch to which the defective electrical load is connected. As a result of the electrical interconnection described, the two on-board network branches are never electrically coupled to one another. Thus, an electrical fault in the one on-board network branch can never affect the electrical load(s) of the other on-board network branch. This ensures that not all electrical loads connected to the on-board electrical system may be affected by an electrical fault.

According to the present exemplary aspect a respective electrical buffer storage is connected to each on-board network branch, which provides electrical energy for each connected load during operation of the motor vehicle, while the at least one switching element connects the connection device to the other on-board network branch. In some embodiments, an electrical accumulator, for example a lithium-ion battery and/or a lead-acid battery, and/or an arrangement with at least one electrical capacitor may be provided as the buffer storage. The buffer storage in each on-board network branch provides the benefit that every electrical load connected to the on-board network branch may be continuously supplied with electrical energy. The buffer storage may be recharged each time the at least one switching element is switched to the on-board network branch.

The present disclosure also comprises embodiments which result in additional benefits.

In some embodiments, the switching device also comprises a test device which is configured to, while the at least one switching element connects the connection device to one of the on-board network branches, i.e., while being switched to one of the on-board network branches, check a predetermined OK criterion in the respective other on-board network branch. The OK criterion may, for example, describe those electrical conditions which indicate that the on-board network branch is short-circuit-free or fault-free. The control device may be configured to switch the at least one switching element to this other on-board network branch only in the event of the test device signaling that the OK criterion is met in the other on-board network branch. So if it is already recognized before switching that the OK criterion has been violated in the other on-board network branch, for example as there is a short circuit or an arc, the at least one switching element in this case may be prevented from switching to this other on-board network branch and that thus the error in the other on-board network branch could then also have an effect on the voltage source. The test device may be designed in a manner known per se in order to detect an electrical fault in the respective on-board network branch.

If, on the other hand, the electrical fault arises in that on-board network branch to which the at least one switching element is currently connected, according to some embodiments, for this very case the test device signals that the OK criterion has been violated in the on-board network branch, to which the at least one switching element is currently switched, i.e., to which on-board network branch the voltage source is electrically coupled, then the at least one switching element switches to the other on-board network branch, which is triggered by the control device. Therefore, the on-board network branch switched off, in which the OK criterion is violated. As a result, this on-board network branch is disconnected from the voltage source and thus the effect of the electrical fault is reduced, for example a current flow through the on-board network branch is reduced.

Some embodiments provide that the OK-criterion comprises that in the respective on-board network branch in which the OK criterion is checked by the test device, a current is less than a predetermined maximum value and/or since the last switchover of the at least one switching element has been continuously smaller than the maximum value. A punctual test or a test for a period of time may therefore be carried out. A short circuit and/or an electric arc may be detected by monitoring the current (intensity). Additionally or alternatively, the OK-criterion may include that a branch voltage in the vehicle on-board network branch, i.e., the electrical voltage of the vehicle on-board network branch, is greater than a predetermined minimum value and/or has been continuous since the last switchover of the at least one switching element. Here, too, the branch voltage is recorded at certain instants of time or observed over a period of time. Monitoring the time period has the benefit that a briefly occurring error is also recognized and has an effect on the decision regarding the switching of the at least one switching element. Additionally or alternatively, the OK-criterion may include that each connected load must signal an error-free operating state. As a result, the self-diagnosis of each electrical load is beneficially used by the test device.

In some embodiments, the control device is configured to generate an emergency signal in the event that the OK-criterion is violated. The emergency operation signal may therefore be used to trigger an adaptation of the operating mode of a motor vehicle to the detected electrical fault.

In some embodiments, the control device of the switching device is configured to switch the at least one switching element whenever a residual amount of energy in the buffer storage of that on-board network branch to which the switch is to be made is less than a predetermined minimum amount. The frequency or rate of switching is thus determined by the respective storage status or the remaining amount in the buffer storage of that on-board network branch that is currently decoupled from the voltage source. The switching rate is thus beneficially adapted to the power requirements of the loads in the two on-board network branches. This minimizes the switching frequency and may thus contribute to reducing wear. The remaining amount in a buffer storage may be determined with circuitry measures known per se and/or, for example, a branch voltage generated by the buffer storage in the on-board network branch may be determined.

If the branch voltage falls below a threshold value, this may be used as a trigger for the switchover. Additionally or alternatively, it may be provided that the switchover takes place at a predetermined switchover frequency or switchover rate, which may be in a range from 10 Hertz to once per minute. The combination with the threshold value provides that, regardless of the threshold value, a switchover is made at the switching rate in any case. If, on the other hand, the branch voltage has already dropped below the threshold value before the end of a switching cycle (inverse value to the switching rate), a switch is made before the end of the switching cycle.

In some embodiments, the switchover device is designed in accordance with the ASIL (Automotive Safety Integrity Level) standard, in particular ASIL-C or ASIL-D. For this purpose, the ASIL only needs to be guaranteed to "not switch" in the event that the OK-criterion is violated in the other on-board network branch to which the switch is to be made, i.e., if there is a fault in that on-board network branch. This is particularly easy to implement from a technical point of view and nevertheless enables the on-board network device to receive ASIL approval.

In some embodiments, an additional on-board network branch is also provided, which however is electrically connected via a fuse element to a connection point which is arranged between the connection device and the switching device. It is therefore a secondary branch which, from the point of view of the voltage source or from the point of view of its connection device, is electrically connected upstream of the switching device, namely at the connection point. All such electrical load(s) that do not require protection by the two vehicle electrical system branches may be connected to such an additional on-board network branch. It may be a so-called QM load, as defined in the ASIL standard. The fuse element, via which the additional on-board network branch is electrically connected to the connection point, may be configured to interrupt this electrical connection to the connection point if an electrical current flowing in the additional on-board network branch is greater than a trigger threshold. The fuse element may be designed, for example, as a fuse or as an electrical switch with amperage monitoring. A short circuit in the additional on-board network branch therefore leads to this additional on-board network branch being electrically decoupled from the voltage source by the fuse element. Thus, an electrical fault in this additional on-board network branch cannot develop any influence on the electrical loads that are connected to the first and second on-board network branches beyond the switchover device.

In some embodiments, the control device of the switching device is configured to hold the new switching state for a predetermined minimum time after the switching of the at least one switching element. This reduces the number of switchover cycles and/or recharge cycles, for example in the case of buffer storages in the on-board network branches. This reduces their wear.

In some embodiments, a load connected to the first on-board network branch is a first partial control of a vehicle function, for example a vehicle steering system, and a remaining load connected to the second on-board network branch is a second control of the same vehicle function, for example the vehicle steering. The vehicle function is designed in such a way that it may also continue to be operated with only one of the two controls, possibly in emergency operation, which may be triggered by the aforementioned emergency signal. Thus, there is the benefit that in the event of an electrical fault in one of the on-board network branches by continuing to supply the other on-board network branch with the on-board network voltage, the vehicle function may continue to operate. This allows, e.g., so-called safety-relevant vehicle functions, such as vehicle steering and/or brake control and/or environmental monitoring, to continue to be operated reliably even in the event of an electrical fault in the on-board network device.

In some embodiments, the voltage source is provided by a generator and/or by a further vehicle electrical system connected via a DC voltage converter. A belt starter generator or a so-called alternator (12 volt generator), for example, may be provided as the generator. In addition or as an alternative to this, a further vehicle on-board network may be connected via a DC voltage converter, for example a high-voltage electrical system or a 48-volt electrical system. The generative voltage generators, namely the voltage source, may therefore beneficially be separated from the first and second on-board network branches by means of the switching device. In each on-board network branch, for example only one buffer storage is provided as a further voltage generator, that is to say an energy storage that exhausts itself in the event of a short circuit, but no generative voltage generator. Thus, in the event of a short circuit in an on-board network branch, the electrical energy converted therein is limited.

Another exemplary aspect provides a motor vehicle, which has an embodiment of the on-board network device according to the preceding aspect. In the motor vehicle, several loads may be divided on two on-board network branches so that in the event of an electrical fault, not all of the loads connected to the on-board network branches are affected by this electrical fault, but only those that are connected to the on-board network branch in which the electrical fault occurs. In addition, it may be avoided that the electrical fault has an effect on the voltage source.

In relation to the present aspect, a motor vehicle for example is a passenger vehicle or a truck.

In order to be able to provide an on-board network device of the type described in a motor vehicle, a switching device is provided for the on-board network device. The switching device according to the present aspect has at least one switching element and a control device. Each switching element may be formed, for example, on the basis of a semiconductor switch, in particular a transistor, or a circuit composed of a plurality of such semiconductors connected in parallel. The control device may be implemented, for example, on the basis of at least one microcontroller. The at least one switching element is configured to connect a connection device of the on-board network device to a first on-board network branch and a second on-board network branch via the at least one switching element. A connection device may be implemented on the basis of a cable and/or a conductor rail, for example. The connection device may additionally or alternatively be implemented on the basis of an electrical contact element, such as a plug or a socket or a screw. Each on-board network branch may be configured in the manner described. Said control device of the switching device may be configured to electrically couple the connection device alternately to the first on-board network branch and the second on-board network branch by switching over the at least one switching element. Thus, only one of the on-board network branches is always connected to the connection device, while the other on-board network branch is electrically decoupled from the connection device. The electrical coupling provides a galvanic connection between the connection device and the respective on-board network branch. As a result of the decoupling, a current flow between the connection device and the respective on-board network branch is blocked.

According to another exemplary aspect, a method for operating an embodiment of the on-board network device according to the first exemplary aspect is provided. The connection device of the vehicle on-board network receives an electrical system voltage from a voltage source. The vehicle on-board network voltage is for example a direct voltage. The vehicle on-board network voltage may be in a range from 9 volts to 60 volts, just to name an example. One or some of at least two loads are connected to a first on-board network branch. Each remaining load is connected to a second branch of the vehicle electrical system. The loads are therefore divided between the two on-board network branches. The connection device is connected to both the first on-board network branch and the second on-board network branch via at least one switching element of the switching device. The control device of the switching device in an alternating manner couples the connection device to the first on-board network branch and to the on-board network branch by switching over the at least one switching element. The vehicle on-board network voltage is thus alternately forwarded to each connected load of the first vehicle on-board network branch and the second vehicle on-board network branch.

Further embodiments may comprise features such as having already been described in connection with the embodiments of the motor vehicle and the network device. For this reason, the corresponding embodiments of the method are not described again herein.

The invention also includes the combinations of the features of the described embodiments.

Reference will now be made to the drawing in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described.

In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

The FIG. shows a motor vehicle 10, which for example may be a passenger vehicle or truck. An on-board network device 11 of the motor vehicle 10 is shown, which may implement an on-board network of the motor vehicle 10. The on-board network device 11 can, for example, be an on-board network for an electrical direct voltage of less than 60 volts, for example with a nominal value of 12 volts. A voltage source 12 may provide a vehicle on-board network voltage U for the vehicle on-board network device 11. The voltage source 12 may include, for example, a generator and/or a DC voltage converter. The vehicle on-board network voltage U may be generated with reference to a reference potential 13, for example a ground potential or a vehicle ground. A first on-board network branch 14 and a second on-board network branch 15 as well as a further on-board network branch 17 of the on-board network device 11 are also shown. The on-board network branches 14, 15 may be connected via a switching device 16 to a connection device 18, which in turn may be connected to the voltage source 12 for receiving the on-board network voltage U.

The further on-board network branch 17 may be connected directly to a connection point 20 of the connection device 18 via a fuse element 19, for example a fuse, where "directly" means before the switching device 16 or in other words between the voltage source 12 and the switching device 16. The further on-board network branch 17 is thus independent of switchover processes in switchover device 16.

Electrical loads 21, 22 may be connected to the on-board network branches 14, 15. The group of loads 21, 22 can, for example, represent electrical loads relevant to the driving operation of motor vehicle 10, for example vehicle steering and/or brake control and/or environmental monitoring. In the further on-board network branch 17, at least one further load 23 may be connected, which may include, for example, an infotainment system (information entertainment system), seat heating, a ventilation fan and/or interior lighting, i.e., in particular only loads that are irrelevant for driving.

In each of the on-board network branches 14, 15, which are connected to the voltage source 12 via the switching device 16, an electrical buffer storage 24 may be provided, which may include, for example, an electrical accumulator, for example a lithium-ion battery, and/or at least one capacitor. The switching device 16 may be electrically connected to the respective on-board network branch 14, 15 at a respective electrical terminal 25.

The switching device 16 may have at least one switching element 26, which may be, for example, a semiconductor switch, for example a transistor, or a semiconductor circuit with more than one semiconductor switch. A control device 27 of the switching device 16 may switch the at least one switching element 26. In a first switching state 28, the connection device 18 and thus the voltage source 12 may be electrically coupled to the first on-board network branch 14, so that the on-board network voltage U is transmitted to the first on-board network branch 14. The second on-board network branch 15 is decoupled from the on-board network voltage U. In a second switching state 29, the other way around, the connection device 18 and thus the voltage source 12 may be electrically coupled to the second on-board network branch 15, so that the on-board network voltage U is passed into the second on-board network branch 15. The first vehicle on-board network branch 14 is decoupled from the vehicle on-board network voltage U during this time. Nevertheless, the loads 21 and 22 of both on-board network branches 14, 15 may be supplied with electricity throughout. This is guaranteed in the decoupled state of the respective on-board network branch 14, 15 by the buffer storage 24 of the respective on-board network branch 14, 15.

The switching device 16 may comprise a test device 30 which is configured to test a predetermined OK-criterion 31 in the other on-board network branch 15 while the at least one switching element 26 connects the connection device 18 to one of the on-board network branches, which means it is checked whether a predetermined, error-free state is present in the other on-board network branch to which the switch is to be made. The control device 27 may be configured to switch the at least one switching element 26 to the other on-board network branch 15 only in the event that the test device 30 signals that the OK-criterion 31 is met in the other on-board network branch 15.

In the event that the test device 30 signals that the OK-criterion 31 is violated in one of the on-board network branches 14, 15 while the at least one switching element 26 is connected to this on-board network branch 14, 15, the control device 27 may switch the at least one switching element to the other on-board network branch 14, 15.

If there is a fault condition, in particular a short circuit and/or an electric arc, there is no switch to this on-board network branch which violates the OK-criterion 31. If an electrical fault occurs in one of the on-board network branches 14, 15, this on-board network branch remains permanently electrically decoupled from the voltage source 12.

The loads 21, 22 each, e.g., offer a partial control of one and the same vehicle function, so that two partial controls are always provided for a vehicle function and each of the partial controls is connected to a different on-board network branch 14, 15. A failure of an on-board network branch 14, 15 thereby makes it possible to continue to operate the vehicle function at least in an emergency mode with the remaining further partial control. Accordingly, it may be provided that the control device 27 outputs an emergency running signal 32 in the event that the OK-criterion 31 is violated, which for example signals the vehicle function to switch to an emergency running mode or emergency mode.

The on-board electrical system device 11 may thus also supply those vehicle functions that require an ASIL, in particular ASIL-C and/or ASIL-D, for the energy supply.

Before changing or switching over the vehicle on-board network voltage U to another vehicle on-board network branch 14, 15, it may now be checked whether there is an electrical fault on the respective terminal 25.

If this is the case, that is to say if the OK-criterion 31 is violated, no switchover or changeover is carried out. Instead, the emergency signal 32 may be generated.

Switching may always take place when the storage capacity of the respective buffer storage 24 of an on-board network branch 14, 15, which is currently decoupled from the voltage source 12, is exhausted. A minimum switchover time or minimum duration 33 may be provided. The minimum duration 33 may be in a range from 0.1 seconds to 2 seconds. As a result, charging cycles and discharging cycles of the buffer storages 24 may run or be set in a predictable manner. Since the buffer storages 24 each include at least one battery, load peaks may also be compensated for.

In the on-board network device 11, it is physically ensured that both terminals 25 are reliably supplied. The requirements for the switching device 16 are only to be directed towards not switching in the event of a fault (OK-criterion 31 violated), which makes it technically easier to meet an ASIL. As long as there is no electrical fault in another load 23 and the voltage source 12 is also functional, the motor vehicle 10 may therefore continue to run even in the event of a fault in one of the on-board network branches 14, 15. If there is an electrical fault in one of the other loads or in another load 23, it is only necessary to wait until the fuse element 19 triggers and thus separates the further on-board network branch 17 from the voltage source 12 or electrically decouples it. The electrical system device 11 is then safe again. In the redundant design described with two on-board network branches 14, 15, the buffer storages 24 also only have to meet lower ASIL requirements.

Overall, the example shows how the invention, e.g., may safeguard a 12-volt energy network, such as for autonomous driving functions.

LIST OF REFERENCE SIGNS

10 Motor vehicle
11 Vehicle electrical system
12 Voltage source
13 Reference potential
14 First on-board network branch
15 Second branch of the vehicle electrical system
16 Switching device
17 Another on-board network branch
18 Connection device
19 Locking element
20 Connection Point
21 Electrical loads
22 Electrical loads
23 Electrical loads
24 Electric buffer storage
25 Terminal
26 Switching element
27 Control device
28 Switching status
29 Switching status
30 Test facility
31 OK criterion
32 Emergency signal
33 Minimum duration
U On-board network voltage The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. An electrical on-board network device for supplying an on-board network voltage to at least two electrical loads in a motor vehicle, the on-board network device comprising:
   a connection device for receiving the on-board network voltage from a voltage source;
   a first on-board network branch for connecting one or more of the at least two loads; and
   a second on-board network branch for connecting one or more of the at least two loads; wherein
   the connection device is connected via at least one switching element to the first on-board network branch and to the second on-board network branch; wherein
   a control device is configured to electrically couple the connection device in an alternating manner to the first on-board network branch and the second on-board network branch by switching the at least one switching element; wherein
   each of the first and second on-board network branch is connected to a respective electrical buffer storage, which buffer storage provides electrical energy for the one or more connected loads while the at least one switching element connects the connection device with the respective other on-board network branch; wherein the respective buffer storage reloads when the at least one switching element is switched to the respective on-board network branch; and wherein the on-board network device comprises a test device configured to check a predetermined OK criterion in the second on-board network branch while the at least one switching element connects the connection device to the first on-board network branch, and wherein the control device is configured to switch the at least one switching element to the second on-board network branch only in the event of the test device signaling that the OK criterion has been met in the second on-board network branch.

2. The on-board network device of claim 1, wherein in the event that the test device signals that the OK criterion is violated in one of the on-board network branches, while the at least one switching element is switched to this on-board network branch, the control device is configured to switch the at least one switching element to the other on-board network branch.

3. The on-board network device of claim 1, wherein the OK criterion comprises that in the respective on-board network branch:
  a current is less than a predetermined maximum value and/or the current continuously has been less than the predetermined maximum value since the last switchover of the at least one switching element and/or
  a branch voltage is greater than a predetermined minimum value and/or the branch voltage continuously has been greater than the predetermined minimum value since the last switchover of the at least one switching element and/or
  each connected load signals an error-free operating state.

4. The on-board network device of claim 1, wherein the control device is configured to generate an emergency operation signal in the event that an OK criterion is violated.

5. The on-board network device of claim 1, wherein the control device is configured to switch the at least one switching element in the case of a residual amount of the buffer storage of that on-board network branch to which it is to be switched to is smaller than a predetermined minimum quantity, and/or wherein the switching is carried out with at least one predetermined switching rate.

6. The on-board network device of claim 1, wherein an additional on-board network branch is electrically connected to a connection point between the connection device and the switching element by a fuse element, and wherein the fuse element is configured to interrupt the electrical connection of the additional on-board network branch to the connection point if an electrical current flowing in the additional on-board network branch is greater than a trigger threshold.

7. The on-board network device of claim 1, wherein the control device is configured to, after switching, hold the new switching state of the at least one switching element for a predetermined minimum period.

8. The on-board network device of claim 1, wherein a load connected to the first on-board network branch is a first partial control of a vehicle function and a load connected to the second on-board network branch is a second partial control of the same vehicle function.

9. The on-board network device of claim 1, wherein the voltage source is provided by a generator and/or by a further on-board network device connected via a DC voltage converter.

10. A motor vehicle, wherein the motor vehicle has an on-board network device for supplying an on-board network voltage to at least two electrical loads in the motor vehicle, the on-board network device comprising:
  a connection device for receiving the on-board network voltage from a voltage source;
  a first on-board network branch for connecting one or more of the at least two loads; and
  a second on-board network branch for connecting one or more of the at least two loads; wherein
  the connection device is connected via at least one switching element to the first on-board network branch and to the second on-board network branch; wherein
  a control device is configured to electrically couple the connection device in an alternating manner to the first on-board network branch and the second on-board network branch by switching the at least one switching element; wherein
  each of the first and second on-board network branch is connected to a respective electrical buffer storage, which buffer storage provides electrical energy for the one or more connected loads while the at least one switching element connects the connection device with the respective other on-board network branch; wherein
  the respective buffer storage reloads when the at least one switching element is switched to the respective on-board network branch; and wherein
  the on-board network device comprises a test device configured to check a predetermined OK criterion in the second on-board network branch while the at least one switching element connects the connection device to the first on-board network branch, and wherein the control device is configured to switch the at least one switching element to the second on-board network branch only in the event of the test device signaling that the OK criterion has been met in the second on-board network branch.

11. A method for operating an on-board network device, wherein a connection device of the on-board network device is configured to receive an on-board network voltage from a voltage source; wherein at least one load is connected to a first on-board network branch; wherein at least one load is connected to a second on-board network branch; wherein the connection device is connected via at least one switching element to the first on-board network branch and the second on-board network branch; and wherein each of the first and second on-board network branch is connected to a respective electrical buffer storage, comprising:
  electrically connecting in an alternating manner the first on-board network branch to the connection device and the second on-board network branch to the connection device by switching the at least one switching element, such that the vehicle on-board network voltage is alternately forwarded to the at least one connected load of the first on-board network branch and to the at least one connected load of the second on-board network branch; and
  checking a predetermined OK criterion in the second on-board network branch while the at least one switching element connects the connection device to the first on-board network branch, wherein switching the at least one switching element to the second on-board network branch in conducted only in the event that the OK criterion has been met in the second on-board network branch.

12. An electrical on-board network device for supplying an on-board network voltage to at least two electrical loads in a motor vehicle, the on-board network device comprising:
- a connection device for receiving the on-board network voltage from a voltage source;
- a first on-board network branch for connecting one or more of the at least two loads; and
- a second on-board network branch for connecting one or more of the at least two loads; wherein
- the connection device is connected via at least one switching element to the first on-board network branch and to the second on-board network branch; wherein
- a control device is configured to electrically couple the connection device in an alternating manner to the first on-board network branch and the second on-board network branch by switching the at least one switching element; wherein
- each of the first and second on-board network branch is connected to a respective electrical buffer storage, which buffer storage provides electrical energy for the one or more connected loads while the at least one switching element connects the connection device with the respective other on-board network branch; wherein
- the respective buffer storage reloads when the at least one switching element is switched to the respective on-board network branch; and wherein
- the control device is configured to one or more of:
- switch the at least one switching element in the case of a residual amount of energy of the buffer storage being smaller than a predetermined minimum threshold, and
- switch the at least one switching element with at least one predetermined switching rate.

13. A motor vehicle, wherein the motor vehicle has an on-board network device for supplying an on-board network voltage to at least two electrical loads in a motor vehicle, the on-board network device comprising:
- a connection device for receiving the on-board network voltage from a voltage source;
- a first on-board network branch for connecting one or more of the at least two loads; and
- a second on-board network branch for connecting one or more of the at least two loads; wherein
- the connection device is connected via at least one switching element to the first on-board network branch and to the second on-board network branch; wherein
- a control device is configured to electrically couple the connection device in an alternating manner to the first on-board network branch and the second on-board network branch by switching the at least one switching element; wherein
- each of the first and second on-board network branch is connected to a respective electrical buffer storage, which buffer storage provides electrical energy for the one or more connected loads while the at least one switching element connects the connection device with the respective other on-board network branch; wherein
- the respective buffer storage reloads when the at least one switching element is switched to the respective on-board network branch; and wherein
- the control device is configured to one or more of:
- switch the at least one switching element in the case of a residual amount of energy of the buffer storage being smaller than a predetermined minimum threshold, and
- switch the at least one switching element with at least one predetermined switching rate.

14. A method for operating an on-board network device, wherein a connection device of the on-board network device is configured to receive an on-board network voltage from a voltage source; wherein at least one load is connected to a first on-board network branch; wherein at least one load is connected to a second on-board network branch; wherein the connection device is connected via at least one switching element to the first on-board network branch and the second on-board network branch; and wherein each of the first and second on-board network branch is connected to a respective electrical buffer storage, comprising:
- electrically connecting in an alternating manner the first on-board network branch to the connection device and the second on-board network branch to the connection device by switching the at least one switching element, such that the vehicle on-board network voltage is alternately forwarded to the at least one connected load of the first on-board network branch and to the at least one connected load of the second on-board network branch; and one or more of:
- switching the at least one switching element in the case of a residual amount of energy of the buffer storage being smaller than a predetermined minimum threshold, and
- switching the at least one switching element with at least one predetermined switching rate.

15. An electrical on-board network device for supplying an on-board network voltage to at least two electrical loads in a motor vehicle, the on-board network device comprising:
- a connection device for receiving the on-board network voltage from a voltage source;
- a first on-board network branch for connecting one or more of the at least two loads; and
- a second on-board network branch for connecting one or more of the at least two loads; wherein
- the connection device is connected via at least one switching element to the first on-board network branch and to the second on-board network branch; wherein
- a control device is configured to electrically couple the connection device in an alternating manner to the first on-board network branch and the second on-board network branch by switching the at least one switching element; wherein
- each of the first and second on-board network branch is connected to a respective electrical buffer storage, which buffer storage provides electrical energy for the one or more connected loads while the at least one switching element connects the connection device with the respective other on-board network branch; wherein
- the respective buffer storage reloads when the at least one switching element is switched to the respective on-board network branch; and wherein
- an additional on-board network branch is electrically connected to a connection point between the connection device and the switching element by a fuse element; and wherein the fuse element is configured to interrupt the electrical connection of the additional on-board network branch to the connection point if an electrical current flowing in the additional on-board network branch is greater than a trigger threshold.

16. A motor vehicle, wherein the motor vehicle has an on-board network device for supplying an on-board network voltage to at least two electrical loads in a motor vehicle, the on-board network device comprising:
- a connection device for receiving the on-board network voltage from a voltage source;
- a first on-board network branch for connecting one or more of the at least two loads; and
- a second on-board network branch for connecting one or more of the at least two loads; wherein the connection device is connected via at least one switching element to the first on-board network branch and to the second on-board network branch; wherein a control device is configured to electrically couple the connection device in an alternating manner to the first on-board network branch and the second on-board network branch by switching the at least one switching element; wherein each of the first and second on-board network branch is connected to a respective electrical buffer storage, which buffer storage provides electrical energy for the one or more connected loads while the at least one switching element connects the connection device with the respective other on-board network branch; wherein the respective buffer storage reloads when the at least one switching element is switched to the respective on-board network branch; and wherein an additional on-board network branch is electrically connected to a connection point between the connection device and the switching element by a fuse element; and wherein the fuse element is configured to interrupt the electrical connection of the additional on-board network branch to the connection point if an electrical current flowing in the additional on-board network branch is greater than a trigger threshold.

17. A method for operating an on-board network device, wherein a connection device of the on-board network device is configured to receive an on-board network voltage from a voltage source; wherein at least one load is connected to a first on-board network branch; wherein at least one load is connected to a second on-board network branch; wherein the connection device is connected via at least one switching element to the first on-board network branch and the second on-board network branch; wherein each of the first and second on-board network branch is connected to a respective electrical buffer storage; and wherein an additional on-board network branch is electrically connected to a connection point between the connection device and the switching element, comprising:

electrically connecting in an alternating manner the first on-board network branch to the connection device and the second on-board network branch to the connection device by switching the at least one switching element, such that the vehicle on-board network voltage is alternately forwarded to the at least one connected load of the first on-board network branch and to the at least one connected load of the second on-board network branch; and interrupting the electrical connection of the additional on-board network branch to the connection point if an electrical current flowing in the additional on-board network branch is greater than a trigger threshold.

18. An electrical on-board network device for supplying an on-board network voltage to at least two electrical loads in a motor vehicle, the on-board network device comprising:

a connection device for receiving the on-board network voltage from a voltage source;

a first on-board network branch for connecting one or more of the at least two loads; and a second on-board network branch for connecting one or more of the at least two loads; wherein the connection device is connected via at least one switching element to the first on-board network branch and to the second on-board network branch; wherein a control device is configured to electrically couple the connection device in an alternating manner to the first on-board network branch and the second on-board network branch by switching the at least one switching element; wherein each of the first and second on-board network branch is connected to a respective electrical buffer storage, which buffer storage provides electrical energy for the one or more connected loads while the at least one switching element connects the connection device with the respective other on-board network branch; wherein the respective buffer storage reloads when the at least one switching element is switched to the respective on-board network branch; and wherein the control device is configured to, after switching, hold the new switching state of the at least one switching element for a predetermined minimum period.

19. A motor vehicle, wherein the motor vehicle has an on-board network device for supplying an on-board network voltage to at least two electrical loads in a motor vehicle, the on-board network device comprising:

a connection device for receiving the on-board network voltage from a voltage source;

a first on-board network branch for connecting one or more of the at least two loads; and a second on-board network branch for connecting one or more of the at least two loads; wherein the connection device is connected via at least one switching element to the first on-board network branch and to the second on-board network branch; wherein a control device is configured to electrically couple the connection device in an alternating manner to the first on-board network branch and the second on-board network branch by switching the at least one switching element; wherein each of the first and second on-board network branch is connected to a respective electrical buffer storage, which buffer storage provides electrical energy for the one or more connected loads while the at least one switching element connects the connection device with the respective other on-board network branch; wherein the respective buffer storage reloads when the at least one switching element is switched to the respective on-board network branch; and wherein the control device is configured to, after switching, hold the new switching state of the at least one switching element for a predetermined minimum period.

20. A method for operating an on-board network device, wherein a connection device of the on-board network device is configured to receive an on-board network voltage from a voltage source; wherein at least one load is connected to a first on-board network branch; wherein at least one load is connected to a second on-board network branch; wherein the connection device is connected via at least one switching element to the first on-board network branch and the second on-board network branch; and wherein each of the first and second on-board network branch is connected to a respective electrical buffer storage, comprising:

electrically connecting in an alternating manner the first on-board network branch to the connection device and the second on-board network branch to the connection device by switching the at least one switching element, such that the vehicle on-board network voltage is alternately forwarded to the at least one connected load of the first on-board network branch and to the at least one connected load of the second on-board network branch; wherein after switching, the new switching state of the at least one switching element is held for a predetermined minimum period.

\* \* \* \* \*